United States Patent
Li et al.

(10) Patent No.: US 12,401,362 B2
(45) Date of Patent: Aug. 26, 2025

(54) PUF CIRCUIT BASED ON THRESHOLD LOSS OF MOSFETS

(71) Applicant: Wenzhou University, Zhejiang (CN)

(72) Inventors: Gang Li, Zhejiang (CN); Pengjun Wang, Zhejiang (CN); Xilong Shao, Zhejiang (CN); Hui Li, Zhejiang (CN); Junjie Zhou, Zhejiang (CN)

(73) Assignee: Wenzhou University, Zhejiang (CN)

( * ) Notice: Subject to any disclaimer, the term of this patent is extended or adjusted under 35 U.S.C. 154(b) by 240 days.

(21) Appl. No.: 18/476,303

(22) Filed: Sep. 27, 2023

(65) Prior Publication Data
US 2025/0038747 A1    Jan. 30, 2025

(30) Foreign Application Priority Data

Jul. 28, 2023 (CN) .......................... 202310935134.1

(51) Int. Cl.
| | | |
|---|---|---|
| H03K 19/003 | (2006.01) | |
| G06F 21/75 | (2013.01) | |
| H03K 5/133 | (2014.01) | |
| H03K 19/20 | (2006.01) | |

(52) U.S. Cl.
CPC ....... H03K 19/00315 (2013.01); G06F 21/75 (2013.01); H03K 5/133 (2013.01); H03K 19/20 (2013.01)

(58) Field of Classification Search
CPC ........... H03K 19/003; H03K 19/00315; H03K 19/00323; G06F 21/70; G06F 21/75; G06F 21/78; H04L 9/3278
See application file for complete search history.

(56) References Cited

U.S. PATENT DOCUMENTS

| | | | | |
|---|---|---|---|---|
| 9,584,329 | B1* | 2/2017 | Trimberger | H04L 9/3278 |
| 10,224,931 | B1* | 3/2019 | Wang | H04L 9/0866 |
| 11,784,835 | B2* | 10/2023 | Kudva | H03K 19/17768 |
| | | | | 380/44 |
| 2019/0132137 | A1* | 5/2019 | Zhong | H04L 9/3278 |
| 2019/0140643 | A1* | 5/2019 | Kuenemund | G09C 1/00 |
| 2021/0066216 | A1* | 3/2021 | Kuenemund | H03K 19/003 |
| 2022/0224333 | A1* | 7/2022 | Wang | H03K 19/21 |
| 2024/0137019 | A1* | 4/2024 | Wang | H03K 19/20 |
| 2024/0169100 | A1* | 5/2024 | Li | G06F 21/75 |
| 2025/0038747 | A1* | 1/2025 | Li | H03K 5/133 |

\* cited by examiner

*Primary Examiner* — Jason M Crawford
(74) *Attorney, Agent, or Firm* — JCIPRNET

(57) ABSTRACT

A PUF circuit based on the threshold loss of MOSFETs comprises N stages of delay units and an arbiter. Each stage of delay unit comprises six inverters and four MOS transistors, wherein the four MOS transistors are all PMOS transistors or NMOS transistors. Each path in each stage of delay unit uses only one PMOS or NMOS transistor and does not use a transmission gate formed by a PMOS transistor and an NMOS transistor. Therefore, it reduces hardware cost. Each MOS transistor on the transmission path has a threshold loss, PMOS and NMOS transistors in a third inverter and a sixth inverter are in an on-state, and output terminals of the third inverter and the sixth inverter will be charged to a high level or discharged to a low level, thus greatly increasing a delay difference between two square signals and enhancing randomness.

3 Claims, 9 Drawing Sheets

PUF CIRCUIT BASED ON THRESHOLD LOSS OF MOSFETS

CROSS-REFERENCE TO RELATED APPLICATION

This application claims the priority benefit of China application serial no. 202310935134.1, filed on Jul. 28, 2023. The entirety of the above-mentioned patent application is hereby incorporated by reference herein and made a part of this specification.

BACKGROUND

Technical Field

The invention relates to PUF circuits, in particular to a PUF circuit based on the threshold loss of MOSFETs.

Description of Related Art

The physical unclonable function (PUF), as a new chip-level security technique, generates responses by extracting process deviations of hardware circuits, and is independent of storage keys or identification information, thus providing higher security. Due to the fact that the deviation of each hardware entity is random and uncontrollable, the PUF circuit is physically unclonable, unpredictable and low in hardware cost, and provides a solution for the resource constrained IoT security field.

The arbiter PUF (APUF), as a typical strong PUF, has been extensively studied due to its advantages of simple structure, low cost and abundant challenge-response pairs. As shown in FIG. 1 which is a structural block diagram of a traditional APUF circuit, the traditional APUF circuit comprises N stages of delay units and an arbiter, $N=2^m$, and m is an integer greater than or equal to 6. When the APUF circuit operates, square signals, used as trigger signals, enter the first stage of delay unit along an upper path and a lower path and are transmitted to the subsequent stages of delay units from the first stage of delay unit. After entering one stage of delay unit, the square signals pass through this stage of delay unit in parallel or in a crossed manner under the action of a control signal input to this stage of delay unit. Wherein, as shown in FIG. 2 which is a circuit diagram of each stage of delay unit of the traditional APUF circuit, each stage of delay unit is composed of eight inverters INV1-INV8 and eight MOS transistors P1-P4 and N1-N4, wherein the transistors N1 and P1 form a first transmission gate, the transistors N2 and P2 form a second transmission gate, the transistors N3 and P3 form a third transmission gate, and the transistors N4 and P4 form a fourth transmission gate. When the square signals enter one stage of delay unit along two paths (a first path square signal in a first path is referred to as IN0 and a second path square signal in a second path is referred to as IN1), if the control signal input to this stage of delay unit satisfies $S_i=0$, the transistors P1 and P3 in this stage of delay unit will be turned on, the transistors N2 and N4 will not be turned on; the control signal $S_i$ will turn into 1 after passing through the inverters INV4 and INV8, the transistors N1 and N3 will be turned on, and the transistors P2 and P4 will not be turned on. That is, when the control signal $S_i=0$, the first transmission gate and the third transmission gate will be turned on, and the second transmission gate and the fourth transmission gate will be turned off; the first path square signal IN0 will be inverted by the inverter INV1, then pass through the first transmission gate, and then be inverted by the inverter INV3 to generate and output a square signal OUT0; the second path square signal IN1 will be inverted by the inverter INV6, then pass through the third transmission gate, and then be inverted by the inverter INV7 to generate and output a square signal OUT1. In this case, the first path square signal IN0 and the second path square signal IN1 pass through this stage of delay unit in parallel. If the control signal input to this stage of delay unit satisfies the control signal $S_i=1$, the transistors N2 and N4 in this stage of delay unit will be turned on, the transistors P1 and P3 will not be turned on; the control signal $S_i$ will turn into 0 after passing through the inverters INV4 and INV8, the transistors P2 and P4 will be turned on, and the transistors N1 and N3 will not be turned on. That is, when the control signal $S_i=1$, the second transmission gate and the fourth transmission gate will be turned on, and the first transmission gate and the third transmission gate will be turned off; the first path square signal IN0 will be inverted by the inverter INV5, then pass through the fourth transmission gate, and then be inverted by the inverter INV7 to output the square signal OUT1; the second path square signal IN1 will be inverted by the inverter INV2, then pass through the second transmission gate, and then be inverted by the inverter INV3 to output the square signal OUT0. In this case, the first path square signal IN0 and the second path square signal IN1 pass through this stage of delay unit in a crossed manner. According to the traditional APUF circuit, the square signal OUT0 outputted by the prior stage of delay unit enters the next stage of delay unit to serve as the first path square signal IN0 of the next stage of delay unit, the square signal OUT1 outputted by the prior stage of delay unit enters the next stage of delay unit to serve as the second path square signal IN1 of the next stage of delay unit, and after the first and second path square signals pass through the N stages of delay units, two square signals outputted by the $N^{th}$ stage of delay unit are input to the arbiter; and under the influence of process deviations of the MOS transistors, there will be a delay difference between the two square signals outputted by the $N^{th}$ stage of delay unit, and the arbiter generates and outputs a response by extracting the delay difference between the two square signals.

However, because the delay unit of the traditional APUF circuit uses multiple transmission gates and each transmission gate is composed of two MOS transistors, the delay unit occupies a large area, which leading to a large hardware expenditures of the traditional APUF circuit; in addition, due to the fact that the transmission gate is a complementary CMOS structure and almost has no threshold loss of MOS transistors, the delay difference between the first and second path square signals passing through the transmission gate is small, and the delay difference between the two square signals outputted by the $N^{th}$ stage of delay unit is also small, making the randomness of responses finally generated by the APUF circuit poor.

SUMMARY

The technical issue to be settled by the invention is to provide a PUF circuit based on the threshold loss of MOSFETs, which has a small hardware expenditure and can generate high-randomness responses.

The technical solution adopted by the invention to settle the above technical issue is as follows: a PUF circuit based on the threshold loss of MOSFETs comprises N stages of delay units and an arbiter, wherein $N=2^m$, m is an integer which is greater than or equal to 6, the N stages of delay units are identical in structure and are cascaded in sequence, the N stages of delay units are sequentially referred to as a first stage of delay unit to an $N^{th}$ stage of delay unit, the $N^{th}$ stage of delay unit is connected to the arbiter, each stage of delay unit is configured to allow two square signals input thereto to pass through in parallel or in a crossed manner under the control of a control signal input to this stage of delay unit to generate and output two square signals, the two square signals generated by the prior stage of delay unit are output to the next stage of delay unit, and the arbiter is configured to extracting, by comparison, a delay difference between the two square signals outputted by the $N^{th}$ stage of delay unit to generate and output a response; and the delay unit comprises six inverters and four MOS transistors, the four MOS transistors are all PMOS transistors or NMOS transistors, the six inverters are referred to as a first inverter, a second inverter, a third inverter, a fourth inverter, a fifth inverter and a sixth inverter respectively, the four MOS transistors are referred to as a first MOS transistor, a second MOS transistor, a third MOS transistor and a fourth MOS transistor respectively, an input terminal of the first inverter is used as a first input terminal of the delay unit to receive a first path square signal, an input terminal of the fourth inverter is used as a second input terminal of the delay unit to receive a second path square signal, an output terminal of the first inverter, a source of the first MOS transistor and a source of the second MOS transistor are connected, an output terminal of the fourth inverter, a source of the third MOS transistor and a source of the fourth MOS transistor are connected, a drain of the first MOS transistor, a drain of the fourth MOS transistor and an input terminal of the third inverter are connected, a drain of the second MOS transistor, a drain of the third MOS transistor and an input terminal of the sixth inverter are connected, a gate of the first MOS transistor, an input terminal of the second inverter, a gate of the third MOS transistor and an input terminal of the fifth inverter are connected and a connecting terminal is used as a control terminal of the delay unit to receive a control signal, an output terminal of the second inverter and a gate of the second MOS transistor are connected, an output terminal of the fifth inverter and a gate of the fourth MOS transistor are connected, and an output terminal of the third inverter and an output terminal of the sixth inverter are used as two output terminals of the delay unit to generate and output two square signals.

When the four MOS transistors are all PMOS transistors, the arbiter comprises two two-input NAND gates, each two-input NAND gate has a first input terminal, a second input terminal and an output terminal, the two two-input NAND gates are referred to as a first two-input NAND gate and a second two-input NAND gate respectively, the first input terminal of the first two-input NAND gate and the second input terminal of the second two-input NAND gate are configured to receive the two square signals outputted by the $N^{th}$ stage of delay unit respectively, the second input terminal of the first two-input NAND gate and the output terminal of the second two-input NAND gate are connected and a connecting terminal is used as an output terminal of the arbiter to output the response, and the output terminal of the first two-input NAND gate and the first input terminal of the second two-input NAND gate are connected.

When the four MOS transistors are all NMOS transistors, the arbiter comprises two two-input NOR gates, wherein each two-input NOR gate has a first input terminal, a second input terminal and an output terminal, the two two-input NOR gates are referred to as a first two-input NOR gate and a second two-input NOR gate respectively, the first input terminal of the first two-input NOR gate and the second input terminal of the second two-input NOR gate are used for receive the two square signals outputted by the $N^{th}$ stage of delay unit respectively, the second input terminal of the first two-input NOR gate and the output terminal of the second two-input NOR gate are connected and a connecting terminal is used as an output terminal of the arbiter to output the response, and the output terminal of the first two-input NOR gate and the first input terminal of the second two-input NOR gate are connected.

Compared with the prior art, the invention has the following advantages: each stage of delay unit of the PUF circuit is formed by six inverters and four MOS transistors, and the four MOS transistors are PMOS transistors or NMOS transistors; in a case where the four MOS transistors in each stage of delay unit of the PUF circuit are all PMOS transistors, when square signals (trigger signals) enter one stage of delay unit along two paths (a first path square signal in a first path is referred to as IN0 and a second path square signal in a second path is referred to as IN1), if a control signal input to this stage of delay unit satisfies the control signal $S_i$=0, the first MOS transistor and the third MOS transistor in this stage of delay unit will be turned on, the control signal $S_i$ will turn into 1 after passing through the second inverter and the fifth inverter, the second MOS transistor and the fourth MOS transistor will not be turned on, the first path square signal IN0 will be inverted by the first inverter, then pass through the first MOS transistor, and then be inverted by the third inverter to generate and output a square signal OUT0, the second path square signal IN1 will be inverted by the fourth inverter, then pass through the third MOS transistor, and then be inverted by the sixth inverter to generate and output a square signal OUT1, and the first path square signal IN0 and the second path square signal IN1 pass through this stage of delay unit in parallel; if the control signal input to this stage of delay unit satisfied the control signal $S_i$=1, the first MOS transistor and the third MOS transistor in this stage of delay unit will not be turned on, the control signal $S_i$ will turn into 0 after passing through the second inverter and the fifth inverter, the second MOS transistor and the fourth MOS transistor will be turned on, the first path square signal IN0 will be inverted by the first inverter, then pass through the second MOS transistor, and then be inverted by the sixth inverter to generate and output the square signal OUT1, the second path square signal IN1 will be inverted by the fourth inverter, then pass through the fourth MOS transistor, and then be inverted by the third inverter to generate and output the square signal OUT0, and the first path square signal IN0 and the second path square signal IN1 pass through this stage of delay unit in a crossed manner; the square signal OUT0 and the square signal OUT1 generated and outputted by this stage of delay unit are input to the next stage of delay unit to serve as the first path square signal IN0 and the second path square signal IN1 of the next stage of delay unit respectively, and after the square signals input to the first stage of delay unit of the PP-PUF circuit sequentially pass through the N stages of delay units, the $N^{th}$ stage of delay unit will generate and output two square signals to the arbiter formed by two cross-coupled NAND gates; due to the process deviations of all the PMOS transistors in the N stages of delay units, there will be an obvious delay difference between the two square signals arriving at the arbiter; when the two square signals input to the arbiter are both high levels, the output terminal of the arbiter will be in a hold state, that is, the response Q outputted by the output terminal of the arbiter will remain unchanged; when the two square signals input to the arbiter are both low levels, the response Q outputted by the output terminal of the arbiter will be 1; when the two square signals input to the arbiter are a high level and a low level respectively, the response Q outputted by the output terminal of the arbiter will be 1 or 0; due to the fact that there will be a delay difference between the two square signals output to the arbiter after the two square signals synchronously entering the first stage of delay unit from the outside are delayed by the N stages of delay units, the two square signals will not arrive at the arbiter at the same time, the two square signals arriving at the arbiter are a high level and a low level respectively, and the arbiter generates and outputs the response according to the state of the two square signals arriving thereat; in a case where the four MOS transistors in each stage of delay unit in the PUF circuit are all NMOS transistors, when square signals (trigger signals) enter one stage of delay unit along two paths (a first path square signal in a first path is referred to as IN0 and a second path square signal in a second path is referred to as IN1), if a control signal input to this stage of delay unit satisfies the control signal $S_i=1$, the first MOS transistor and the third MOS transistor in this stage of delay unit will be turned on, the control signal $S_i$ will turn into 0 after passing through the second inverter and the fifth inverter, the second MOS transistor and the fourth MOS transistor will not be turned on, the first path square signal IN0 will be inverted by the first inverter, then pass through the first MOS transistor, and then be inverted by the third inverter to generate and output a square signal OUT0, the second path square signal IN1 will be inverted by the fourth inverter, then pass through the third MOS transistor, and then be inverted by the sixth inverter to generate and output a square signal OUT1, and the first path square signal IN0 and the second path square signal IN1 pass through this stage of delay unit in parallel; if the control signal input to this stage of delay unit satisfies the control signal $S_i=0$, the first MOS transistor and the third MOS transistor in this stage of delay unit will not be turned on, the control signal $S_i$ will turn into 1 after passing through the second inverter and the fifth inverter, the second MOS transistor and the fourth MOS transistor will be turned on, the first path square signal IN0 will be inverted by the first inverter, then pass through the second MOS transistor, and then be inverted by the sixth inverter to generate and output the square signal OUT1, the second path square signal IN1 will be inverted by the fourth inverter, then pass through the fourth MOS transistor, and then be inverted by the third inverter to generate and output the square signal OUT0, and the first path square signal IN0 and the second path square signal IN1 pass through this stage of delay unit in a crossed manner; the square signal OUT0 and the square signal OUT1 generated and outputted by this stage of delay unit are input to the next stage of delay unit to serve as the first path square signal IN0 and the second path square signal IN1 of the next stage of delay unit respectively, and after the square signals input to the NN-PUF circuit pass through the N stages of delay units, the $N^{th}$ stage of delay unit will output two square signals to the arbiter formed by two cross-coupled NOR gates; due to the process deviations of all the NMOS transistors in the N stages of delay units, there will be an obvious delay difference between the two square signals arriving at the arbiter; when the two square signals input to the arbiter are both low levels, the output terminal of the arbiter will be in a hold state, that is, the response Q outputted by the output terminal of the arbiter will remain unchanged; when the two square signals input to the arbiter are both high levels, the response Q outputted by the output terminal of the arbiter will be 0; when the two square signals input to the arbiter are a low level and a high level respectively, the response Q outputted by the output terminal of the arbiter will be 0 or 1; due to the fact that there will be a delay difference between the two square signals output to the arbiter after the two square signals synchronously entering the first stage of delay unit from the outside are delayed by the N stages of delay unit, the two square signals will not arrive at the arbiter at the same time, the two square signals arriving at the arbiter are a high level and a low level respectively, and the arbiter generates and outputs the response according to the state of the two square signals. As can be seen from above, each path in each stage of delay unit in the PUF circuit of the invention uses only one PMOS or NMOS transistor and does not use a transmission gate formed by a PMOS transistor and an NMOS transistor, such that the number of MOS transistors in the delay unit is reduced, and the hardware expenditure is reduced; when the delay unit transmits a low level, if the four MOS transistors in the delay unit are all PMOS transistors, the PMOS transistors on the transmission path will not be pulled down to a full-amplitude low level (VSS) and can only be pulled down to the absolute value $|V_{thp}|$ of a threshold voltage $V_{thp}$ of the PMOS transistors, so the voltage reaching the input terminal of the third inverter and the input terminal of the sixth inverter is the absolute value $|V_{thp}|$ of the threshold voltage $V_{thp}$ of the PMOS transistors, and at this moment, PMOS and NMOS transistors in the third inverter and the sixth inverter are in an on-state, so the two inverters will be discharged when charged (charging is dominant, and discharging is subordinate), the output terminal of the third inverter and the output terminal of the sixth inverter will be finally charged to a high level, and the delay difference between the square signals outputted by the delay unit is greatly increased, thus improving the randomness of the PUF circuit; if the four MOS transistors in the delay unit are all NMOS transistors, the NMOS transistors on the transmission path will not be pulled up to a full-amplitude high level and can only be pulled up to $VDD-V_{thn}$ ($V_{thn}$ is the threshold voltage of the NMOS transistors), so the voltage of the input terminal of the third inverter and the input terminal of the sixth inverter is $VDD-V_{thn}$; at this moment, the PMOS and NMOS transistors in the third inverter and the sixth inverter are in an on-state, so the two inverters will be charged when discharged (discharging is dominant, and charging is subordinate), the output terminal of the third inverter and the output terminal of the sixth inverter will be finally discharged to a low level, and the delay difference between the square signals outputted by the delay unit is greatly increased, thus improving the randomness of the PUF circuit. Therefore, by improving the structure of the delay unit, the delay unit can be implemented with fewer MOS transistors (compared with the existing delay unit, the number of MOS transistors in the delay unit in the invention is reduced by 8), and the number of the inverters is also reduced, so the hardware expenditure is small; and due to the threshold loss of the MOS transistors in each stage of delay unit, the delay difference between square signals outputted by the delay unit is greatly increased, ensuring that the response finally outputted by the delay unit has high randomness.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated

DESCRIPTION OF THE EMBODIMENTS

The invention will be described in further detail below in conjunction with the accompanying drawings and embodiments.

Figure 1:
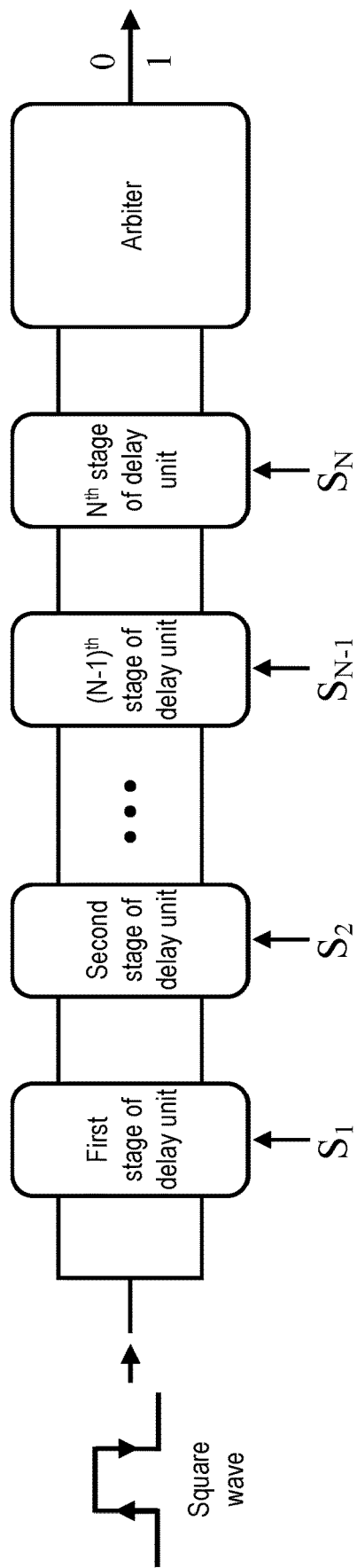
FIG. 1 is a structural block diagram of a traditional APUF.
Figure 2:
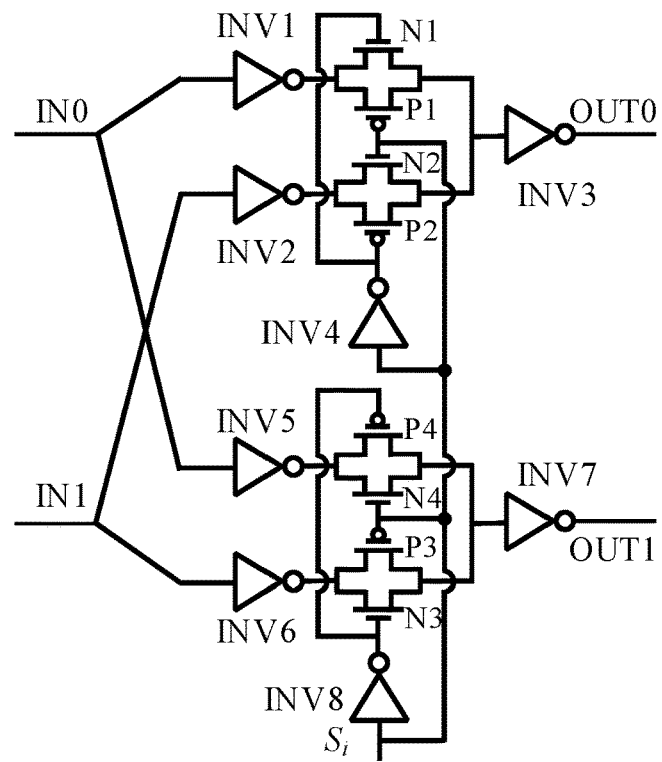
FIG. 2 is a circuit diagram of a delay unit of the traditional APUF.
Figure 3:
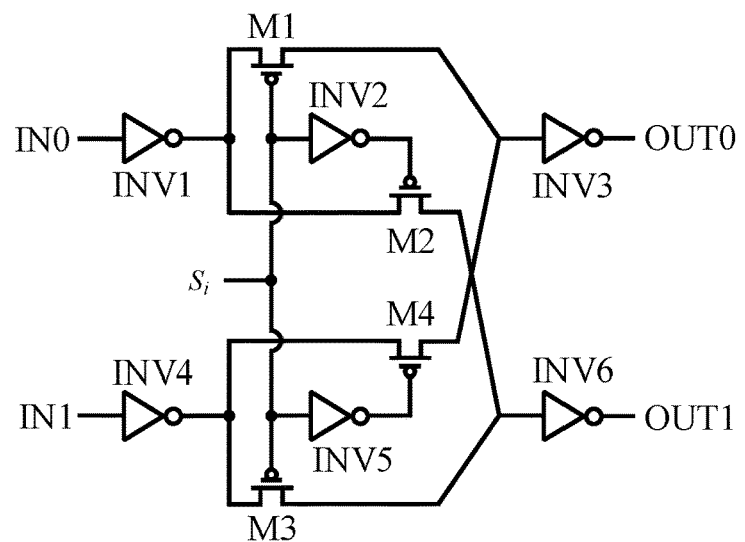
FIG. 3 is a circuit diagram of a delay unit of a PUF circuit based on the threshold loss of MOSFETs in Embodiment 1 of the invention.

Embodiment 1: As shown in FIG. 1 and FIG. 3, a PUF circuit based on the threshold loss of MOSFETs comprises N stages of delay units and an arbiter, wherein N=$2^m$, m is an integer which is greater than or equal to 6; the N stages of delay units are identical in structure and are cascaded in sequence; the N stages of delay units are sequentially referred to as a first stage of delay unit to an $N^{th}$ stage of delay unit; the $N^{th}$ stage of delay unit is connected to the arbiter; each stage of delay unit is configured to allow two square signals input thereto to pass through in parallel or in a crossed manner under the control of a control signal input to this stage of delay unit to generate and output two square signals; the two square signals generated by the prior stage of delay unit are output to the next stage of delay unit; the arbiter is configured to extracting, by comparison, a delay difference between the two square signals outputted by the $N^{th}$ stage of delay unit to generate and output a response; the delay unit comprises six inverters and four MOS transistors; the four MOS transistors are all PMOS transistors or NMOS transistors; the six inverters are referred to as a first inverter INV1, a second inverter INV2, a third inverter INV3, a fourth inverter INV4, a fifth inverter INV5 and a sixth inverter INV6 respectively; the four MOS transistors are referred to as a first MOS transistor M1, a second MOS transistor M2, a third MOS transistor M3 and a fourth MOS transistor M4 respectively; an input terminal of the first inverter INV1 is used as a first input terminal of the delay unit to receive a first path square signal; an input terminal of the fourth inverter INV4 is used as a second input terminal of the delay unit to receive a second path square signal; an output terminal of the first inverter INV1, a source of the first MOS transistor M1 and a source of the second MOS transistor M2 are connected; an output terminal of the fourth inverter INV4, a source of the third MOS transistor M3 and a source of the fourth MOS transistor M4 are connected; a drain of the first MOS transistor M1, a drain of the fourth MOS transistor M4 and an input terminal of the third inverter INV3 are connected; a drain of the second MOS transistor M2, a drain of the third MOS transistor M3 and an input terminal of the sixth inverter INV6 are connected; a gate of the first MOS transistor M1, an input terminal of the second inverter INV2, a gate of the third MOS transistor M3 and an input terminal of the fifth inverter INV5 are connected; a connecting terminal is used as a control terminal of the delay unit to receive a control signal; an output terminal of the second inverter INV2 and a gate of the second MOS transistor M2 are connected; an output terminal of the fifth inverter INV5 and a gate of the fourth MOS transistor M4 are connected; and, an output terminal of the third inverter INV3 and an output terminal of the sixth inverter INV6 are used as two output terminals of the delay unit to generate and output two square signals.

Figure 4:
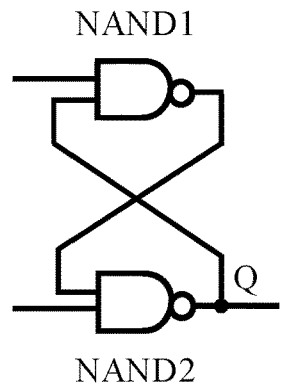
FIG. 4 is a circuit diagram of an arbiter of the PUF circuit based on the threshold loss of MOSFETs in Embodiment 1 of the invention.

In this embodiment, as shown in FIG. 4, the arbiter comprises two two-input NAND gates, each two-input NAND gate has a first input terminal, a second input terminal and an output terminal; the two two-input NAND gates are referred to as a first two-input NAND gate NAND1 and a second two-input NAND gate NAND2 respectively; the first input terminal of the first two-input NAND gate NAND1 and the second input terminal of the second two-input NAND gate NAND2 are configured to receive the two square signals outputted by the $N^{th}$ stage of delay unit respectively; the second input terminal of the first two-input NAND gate NAND1 and the output terminal of the second two-input NAND gate NAND2 are connected; and, a connecting terminal is used as an output terminal of the arbiter to output the response Q; and, the output terminal of the first two-input NAND gate NAND1 and the first input terminal of the second two-input NAND gate NAND2 are connected.

The PUF circuit based on the threshold loss of MOSFETs in this embodiment is called a PP-PUF circuit. In the PP-PUF circuit, when square signals (trigger signals) enter one stage of delay unit along two paths (a first path square signal in a first path is referred to as IN0 and a second path square signal in a second path is referred to as IN1), if a control signal input to this stage of delay unit satisfies the control signal $S_i$=0, the first MOS transistor M1 and the third MOS transistor M3 in this stage of delay unit will be turned on; control signal $S_i$ will turn into 1 after passing through the second inverter INV2 and the fifth inverter INV5, and the second MOS transistor M2 and the fourth MOS transistor M4 will not be turned on; the first path square signal IN0 will be inverted by the first inverter INV1, then pass through the first MOS transistor M1, and then be inverted by the third inverter INV3 to generate and output a square signal OUT0; the second path square signal IN1 will be inverted by the fourth inverter INV4, then pass through the third MOS transistor M3, and then be inverted by the sixth inverter INV6 to generate and output a square signal OUT1; the first path square signal IN0 and the second path square signal IN1 pass through this stage of delay unit in parallel; if the control signal input to this stage of delay unit satisfied the control signal $S_i=1$, the first MOS transistor M1 and the third MOS transistor M3 in this stage of delay unit will not be turned on; the control signal $S_i$ will turn into 0 after passing through the second inverter INV2 and the fifth inverter INV5, and the second MOS transistor M2 and the fourth MOS transistor M4 will be turned on; the first path square signal IN0 will be inverted by the first inverter INV1, then pass through the second MOS transistor M2, and then be inverted by the sixth inverter INV6 to generate and output the square signal OUT1; the second path square signal IN1 will be inverted by the fourth inverter INV4, then pass through the fourth MOS transistor M4, and then be inverted by the third inverter INV3 to generate and output the square signal OUT0; the first path square signal IN0 and the second path square signal IN1 pass through this stage of delay unit in a crossed manner; the square signal OUT0 and the square signal OUT1 generated and outputted by this stage of delay unit are input to the next stage of delay unit to serve as the first path square signal IN0 and the second path square signal IN1 of the next stage of delay unit respectively. In this way, after the square signals input to the first stage of delay unit of the PP-PUF circuit sequentially pass through the N stages of delay units, the $N^{th}$ stage of delay unit will generate and output two square signals to the arbiter formed by two cross-coupled NAND gates, and due to the process deviations of all the PMOS transistors in the N stages of delay units, there will be an obvious delay difference between the two square signals arriving at the arbiter. According to the circuit structure of the arbiter, when the two square signals input to the arbiter are both high levels, the output terminal of the arbiter will be in a hold state, that is, the response Q outputted by the output terminal of the arbiter will remain unchanged; when the two square signals input to the arbiter are both low levels, the response Q outputted by the output terminal of the arbiter will be 1; when the first two-input NAND gate NAND1 (the first input terminal of the arbiter) receives a high level first and the second two-input NAND gate NAND2 (the second input terminal of the arbiter) receives a high level later, the first path square signal entering the arbiter will be a high level, the second path square signal entering the arbiter will be a low level, and the response Q outputted by the output terminal of the arbiter will be 1; when the second two-input NAND gate NAND2 (the second input terminal of the arbiter) receives a high level first and the first two-input NAND gate NAND1 (the first input terminal of the arbiter) receives a high level later, the first path square signal entering the arbiter will be a low level, the second path square signal entering the arbiter will be a high level, and the response Q outputted by the output terminal of the arbiter will be 0; due to the fact that there will be a delay difference between the two square signals output to the arbiter after the two square signals synchronously entering the first stage of delay unit from the outside are delayed by the N stages of delay units, the two square signals will not arrive at the arbiter at the same time, the two square signals arriving at the arbiter are a high level and a low level respectively, and the arbiter generates and outputs the response according to the state of the two square signals arriving thereat.

In the PP-PUF circuit, each path in the delay unit uses only one PMOS transistor and does not use a transmission gate formed by a PMOS transistor and an NMOS transistor, such that the number of MOS transistors in the delay unit is reduced, and the hardware expenditure is reduced; when the delay unit transmits a low level, the PMOS transistors will not be pulled down to a full-amplitude low level (VSS) and can only be pulled down to the absolute value $|V_{thp}|$ of a threshold voltage $V_{thp}$ of the PMOS transistors, so the voltage reaching the input terminal of the third inverter INV3 and the input terminal of the sixth inverter INV6 is the absolute value $|V_{thp}|$ of the threshold voltage $V_{thp}$ of the PMOS transistors, and at this moment, PMOS and NMOS transistors in the third inverter INV3 and the sixth inverter INV6 are in an on-state, so the two inverters will be discharged when charged (charging is dominant, and discharging is subordinate), the output terminal of the third inverter INV3 and the output terminal of the sixth inverter INV6 will be finally charged to a high level, and the delay difference between the square signals outputted by the delay unit is greatly increased, thus improving the randomness of the PUF circuit.

Figure 5:
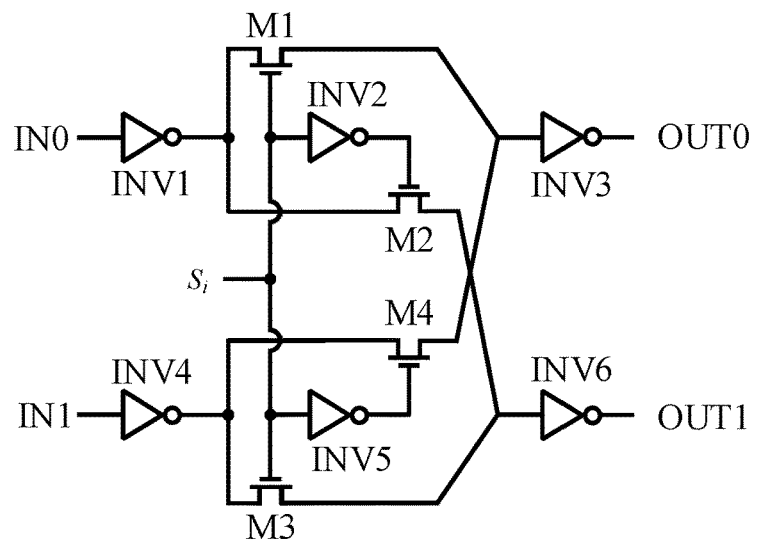
FIG. 5 is a circuit diagram of a delay unit of a PUF circuit based on the threshold loss of MOSFETs in Embodiment 2 of the invention.

Embodiment 2: As shown in FIG. 1 and FIG. 5, a PUF circuit based on the threshold loss of MOSFETs comprises N stages of delay units and an arbiter, wherein $N=2^m$, m is an integer which is greater than or equal to 6; the N stages of delay units are identical in structure and are cascaded in sequence; the N stages of delay units are sequentially referred to as a first stage of delay unit to an $N^{th}$ stage of delay unit; the $N^{th}$ stage of delay unit is connected to the arbiter; each stage of delay unit is configured to allow two square signals input thereto to pass through in parallel or in a crossed manner under the control of a control signal input to this stage of delay unit to generate and output two square signals; the two square signals generated by the prior stage of delay unit are output to the next stage of delay unit; the arbiter is configured to extracting, by comparison, a delay difference between the two square signals outputted by the $N^{th}$ stage of delay unit to generate and output a response Q; the delay unit comprises six inverters and four MOS transistors; the four MOS transistors are all PMOS transistors or NMOS transistors; the six inverters are referred to as a first inverter INV1, a second inverter INV2, a third inverter INV3, a fourth inverter INV4, a fifth inverter INV5 and a sixth inverter INV6 respectively; the four MOS transistors are referred to as a first MOS transistor M1, a second MOS transistor M2, a third MOS transistor M3 and a fourth MOS transistor M4 respectively; an input terminal of the first inverter INV1 is used as a first input terminal of the delay unit to receive a first path square signal; an input terminal of the fourth inverter INV4 is used as a second input terminal of the delay unit to receive a second path square signal; an output terminal of the first inverter INV1, a source of the first MOS transistor M1 and a source of the second MOS transistor M2 are connected; an output terminal of the fourth inverter INV4, a source of the third MOS transistor M3 and a source of the fourth MOS transistor M4 are connected; a drain of the first MOS transistor M1, a drain of the fourth MOS transistor M4 and an input terminal of the third inverter INV3 are connected; a drain of the second MOS transistor M2, a drain of the third MOS transistor M3 and an input terminal of the sixth inverter INV6 are connected; a gate of the first MOS transistor M1, an input terminal of the second inverter INV2, a gate of the third MOS transistor M3 and an input terminal of the fifth inverter INV5 are connected, a connecting terminal is used as a control terminal of the delay unit to receive a control signal; an output terminal of the second inverter INV2 and a gate of the second MOS transistor M2 are connected; an output terminal of the fifth inverter INV5 and a gate of the fourth MOS transistor are connected; and, an output terminal of the third inverter INV3 and an output terminal of the sixth inverter INV6 are used as two output terminals of the delay unit to generate and output two square signals.

Figure 6:
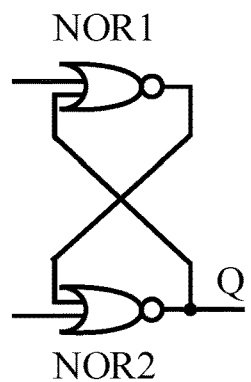
FIG. 6 is a circuit diagram of an arbiter of the PUF circuit based on the threshold loss of MOSFETs in Embodiment 2 of the invention.

In this embodiment, as shown in FIG. 6, the arbiter comprises two two-input NOR gates, wherein each two-input NOR gate has a first input terminal, a second input terminal and an output terminal, the two two-input NOR gates are referred to as a first two-input NOR gate NOR1 and a second two-input NOR gate NOR2 respectively; the first input terminal of the first two-input NOR gate NOR1 and the second input terminal of the second two-input NOR gate NOR2 are used for receive the two square signals outputted by the $N^{th}$ stage of delay unit respectively; the second input terminal of the first two-input NOR gate NOR1 and the output terminal of the second two-input NOR gate NOR2 are connected; a connecting terminal is used as an output terminal of the arbiter to output the response; and, the output terminal of the first two-input NOR gate NOR1 and the first input terminal of the second two-input NOR gate NOR2 are connected.

The PUF circuit based on the threshold loss of MOSFETs in this embodiment is called an NN-PUF circuit. In the NN-PUF circuit, when square signals (trigger signals) enter one stage of delay unit along two paths (a first path square signal in a first path is referred to as IN0 and a second path square signal in a second path is referred to as IN1), if a control signal input to this stage of delay unit satisfies the control signal $S_i=1$, the first MOS transistor M1 and the third MOS transistor M3 in this stage of delay unit will be turned on; the control signal $S_i$ will turn into 0 after passing through the second inverter INV2 and the fifth inverter INV5, and the second MOS transistor M2 and the fourth MOS transistor M4 will not be turned on; the first path square signal IN0 will be inverted by the first inverter INV1, then pass through the first MOS transistor M1, and then be inverted by the third inverter INV3 to generate and output a square signal OUT0; the second path square signal IN1 will be inverted by the fourth inverter INV4, then pass through the third MOS transistor M3, and then be inverted by the sixth inverter INV6 to generate and output a square signal OUT1; the first path square signal IN0 and the second path square signal IN1 pass through this stage of delay unit in parallel; if the control signal input to this stage of delay unit satisfies the control signal $S_i$—0, the first MOS transistor M1 and the third MOS transistor M3 in this stage of delay unit will not be turned on; the control signal $S_i$ will turn into 1 after passing through the second inverter INV2 and the fifth inverter INV5, and the second MOS transistor M2 and the fourth MOS transistor M4 will be turned on; the first path square signal IN0 will be inverted by the first inverter INV1, then pass through the second MOS transistor M2, and then be inverted by the sixth inverter IN6 to generate and output the square signal OUT1; the second path square signal IN1 will be inverted by the fourth inverter INV4, then pass through the fourth MOS transistor M4, and then be inverted by the third inverter INV3 to generate and output the square signal OUT0; the first path square signal IN0 and the second path square signal IN1 pass through this stage of delay unit in a crossed manner; and, the square signal OUT0 and the square signal OUT1 generated outputted by this stage of delay unit are input to the next stage of delay unit to serve as the first path square signal IN0 and the second path square signal IN1 of the next stage of delay unit respectively. In this way, after the square signals input to the NN-PUF circuit pass through the N stages of delay units, the $N^{th}$ stage of delay unit will output two square signals to the arbiter formed by two cross-coupled NOR gates; due to the process deviations of all the NMOS transistors in the N stages of delay units, there will be an obvious delay difference between the two paths of square signal arriving at the arbiter; when the two square signals input to the arbiter are both low levels, the output terminal of the arbiter will be in a hold state, that is, the response Q outputted by the output terminal of the arbiter will remain unchanged; when the two square signals input to the arbiter are both high levels, the response Q outputted by the output terminal of the arbiter will be 0; when the first two-input NOR gate NOR1 (the first input terminal of the arbiter) receives a low level first and the second two-input NOR gate NOR2 (the second input terminal of the arbiter) receives a high level later, the first path square signal entering the arbiter is a low level, the second path square signal entering the arbiter is a high level, and the response Q outputted by the output terminal of the arbiter will be 0; when the second two-input NOR gate NOR2 (the second input terminal of the arbiter) receives a low level first and the first two-input NOR gate NOR1 (the first input terminal of the arbiter) receives a high level later, the first path square signal entering the arbiter is a high level, the second path square signal entering the arbiter is a low level, and the response Q outputted by the output terminal of the arbiter will be 1. Due to the fact that there will be a delay difference between the two square signals output to the arbiter after the two square signals synchronously entering the first stage of delay unit from the outside are delayed by the N stages of delay unit, the two square signals will not arrive at the arbiter at the same time, the two square signals arriving at the arbiter are a high level and a low level respectively, and the arbiter generates and outputs the response according to the state of the two square signals.

In the NN-PUF circuit, each path in the delay unit uses only one NMOS transistor and does not use a transmission gate formed by a PMOS transistor and an NMOS transistor, such that the number of MOS transistors in the delay unit is reduced, and the hardware expenditure is reduced; when the delay unit transmits a high level, the NMOS transistors will not be pulled up to a full-amplitude high level and can only be pulled up to $VDD-V_{thn}$ ($V_{thn}$ is the threshold voltage of the NMOS transistors), so the voltage of the input terminal of the third inverter INV3 and the input terminal of the sixth inverter INV6 is $VDD-V_{thn}$; at this moment, the PMOS and NMOS transistors in the third inverter INV3 and the sixth inverter INV6 are in an on-state, so the two inverters will be charged when discharged (discharging is dominant, and charging is subordinate), the output terminal of the third inverter INV3 and the output terminal of the sixth inverter INV6 will be finally discharged to a low level, and the delay difference between the square signals outputted by the delay unit is greatly increased, thus improving the randomness of the PUF circuit.

Figure 7:
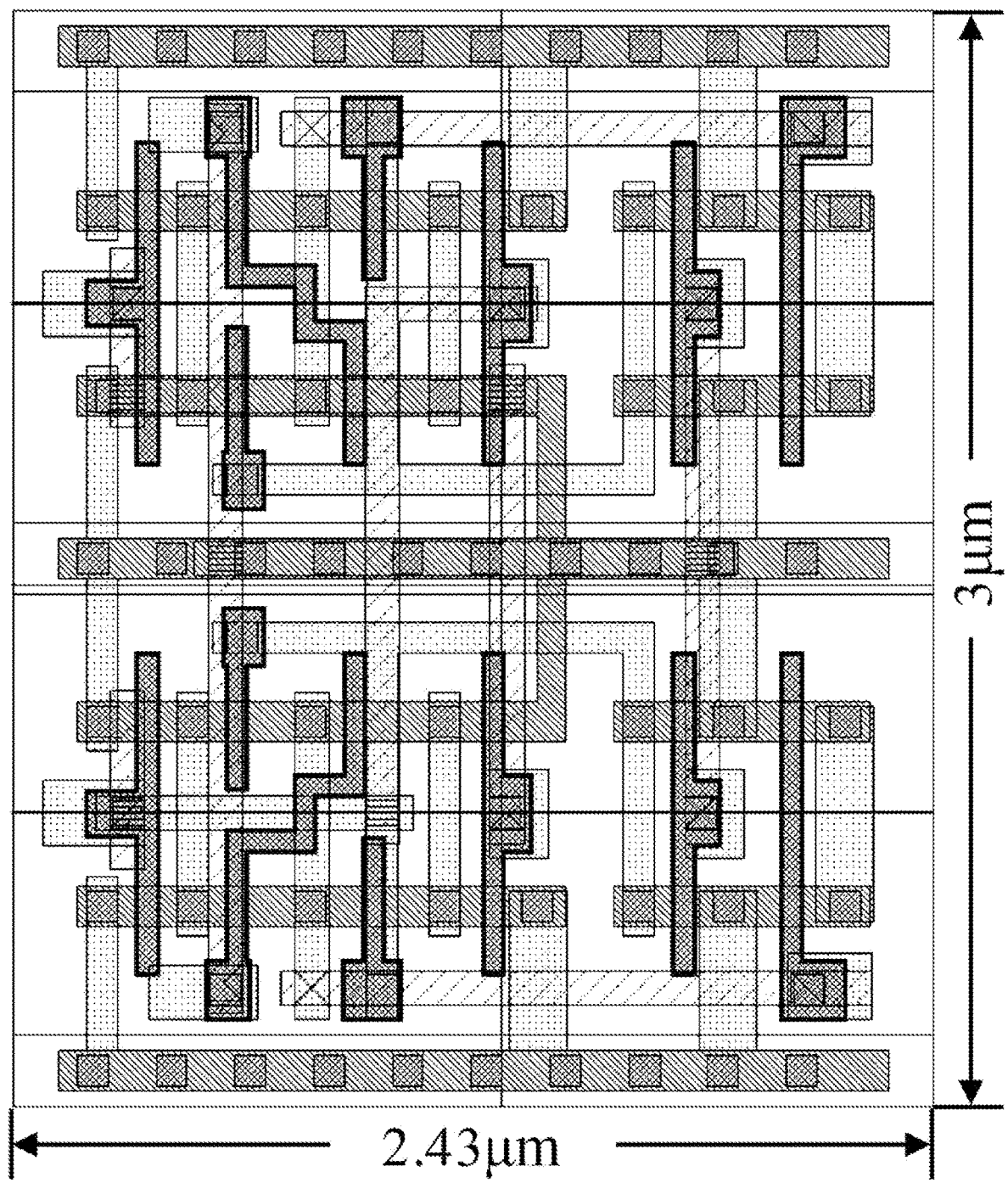
FIG. 7 illustrates the layout of delay units of the traditional APUF circuit.
Figure 8:
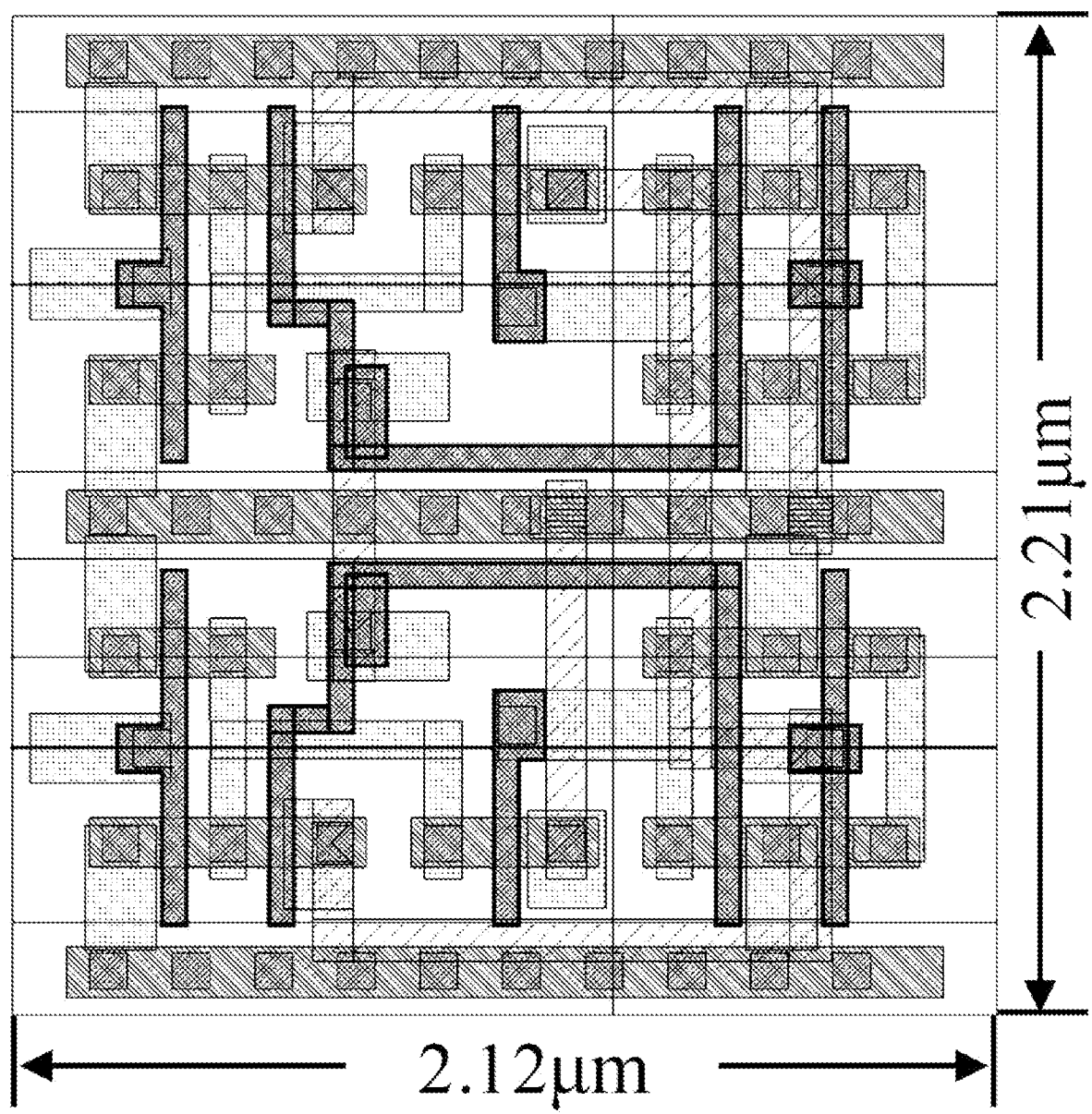
FIG. 8 illustrates the layout of delay units of the PUF circuit based on the threshold loss of MOSFETs in Embodiment 1 of the invention.
Figure 9:
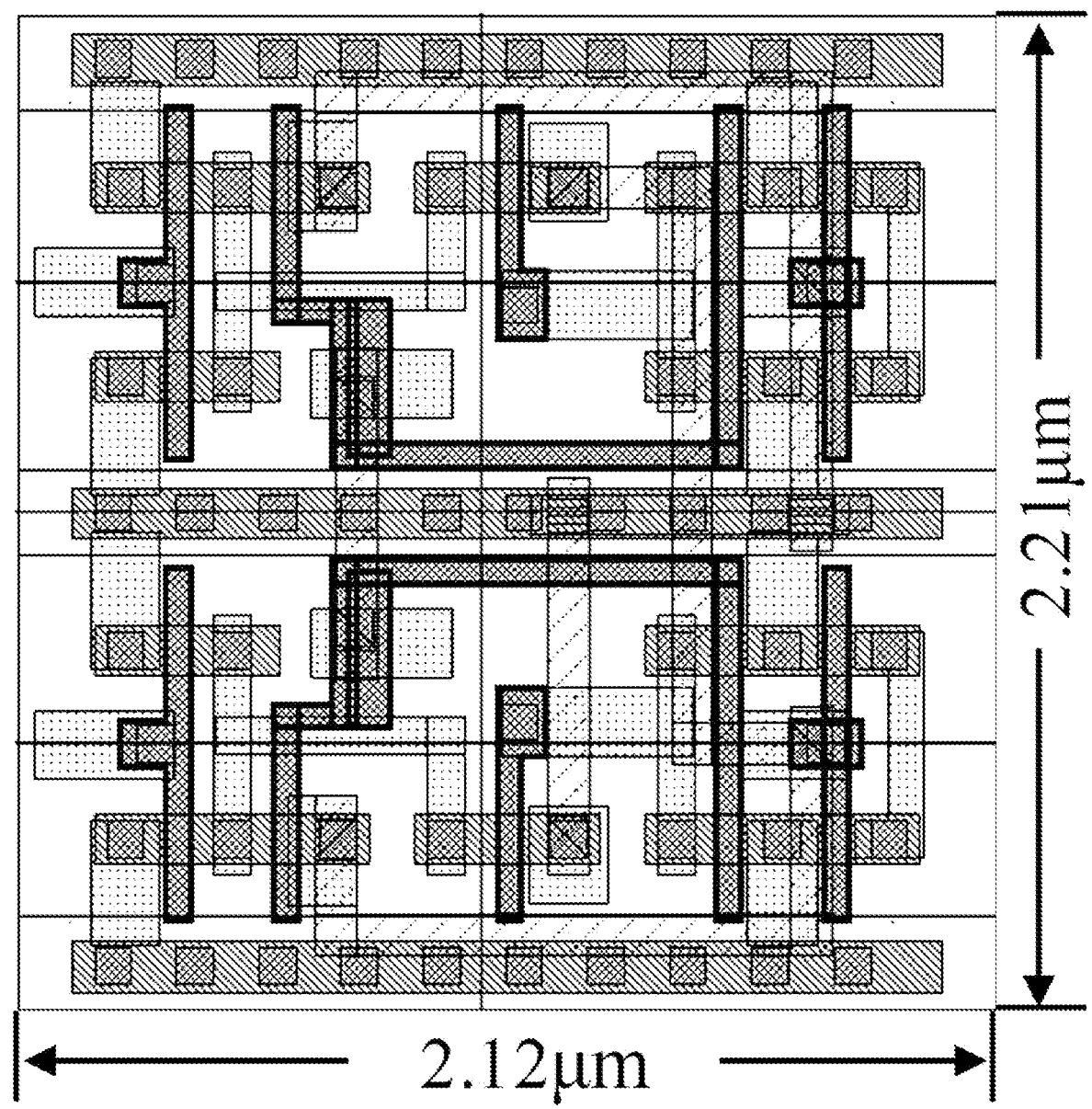
FIG. 9 illustrates the layout of delay units of the PUF circuit based on the threshold loss of MOSFETs in Embodiment 2 of the invention.

The layout of the delay units of a traditional APUF circuit is shown in FIG. 7, the layout of the delay units of the PUF circuit based on the threshold loss of MOSFETs in Embodiment 1 of the invention is shown in FIG. 8, and the layout of the delay units of the PUF circuit based on the threshold loss of MOSFETs in Embodiment 2 of the invention is shown in FIG. 9. It can be known, by analyzing FIG. 7 to FIG. 9, that the delay unit of the PUF circuit based on the threshold loss of MOSFETs in Embodiment 1 and Embodiment 2 only adopt 16 MOS transistors (each inverter adopts two MOS transistors, and the four inverters adopt 12 MOS transistors in total), the layout area is 4.6852 µm²; and, compared with the delay unit (adopting 24 MOS transistors) of the traditional APUS circuit, 8 MOS transistors are omitted, so the hardware expenditure is reduced, the area expenditure is saved by 35%, and the delay unit is lighter.

The reliability and uniqueness of the PUF circuit are described with the intra-hamming distance and the inter-hamming distance respectively. If the intra-hamming distance is closer to 0, it indicates that the reliability is better; and if the inter-hamming distance is closer to 0.5, it indicates that the uniqueness is better.

Figure 10A:
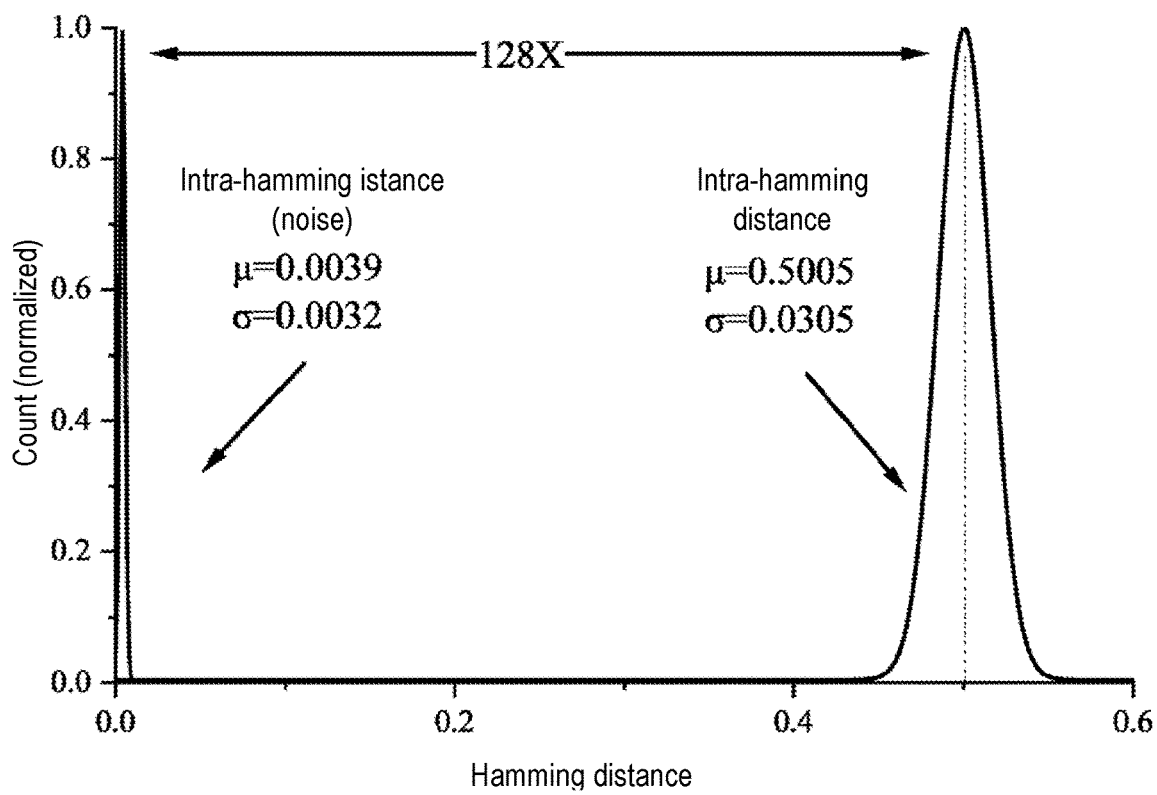
FIG. 10A illustrates the intra-hamming distance and the inter-hamming distance of the PUF circuit based on the threshold loss of MOSFETs in Embodiment 1 of the invention.

The intra-hamming distance and inter-hamming distance of the PUF circuit based on the threshold loss of MOSFETs in Embodiment 1 of the invention are shown in FIG. 10A. The intra-hamming distance of the PP-PUF circuit is tested as follows: in the same standard environment of 27° C. and 1.2V, noise with a frequency being three times that of square signals is applied to the PUF circuit to perform noise simulation on the PUF circuit 30 times, 1,000 sets of responses are extracted every time, the intra-hamming distance is calculated finally, and it can be seen from FIG. 10A that the intra-hamming distance of the PP-PUF circuit is 0.0039, indicating that the PP-PUF circuit has good reliability. The inter-hamming distance of the PP-PUF circuit is tested as follows: in the same standard environment of 27° C. and 1.2V, Monte Carlo simulation is performed on the PUF circuit 50 tines, 10,000 sets of responses are extracted every time, the inter-hamming distance is calculated finally, and it can be seen from FIG. 10A that the inter-hamming distance of the PP-PUF circuit is 0.5005, indicating that the PP-PUF circuit has good uniqueness.

Figure 10B:
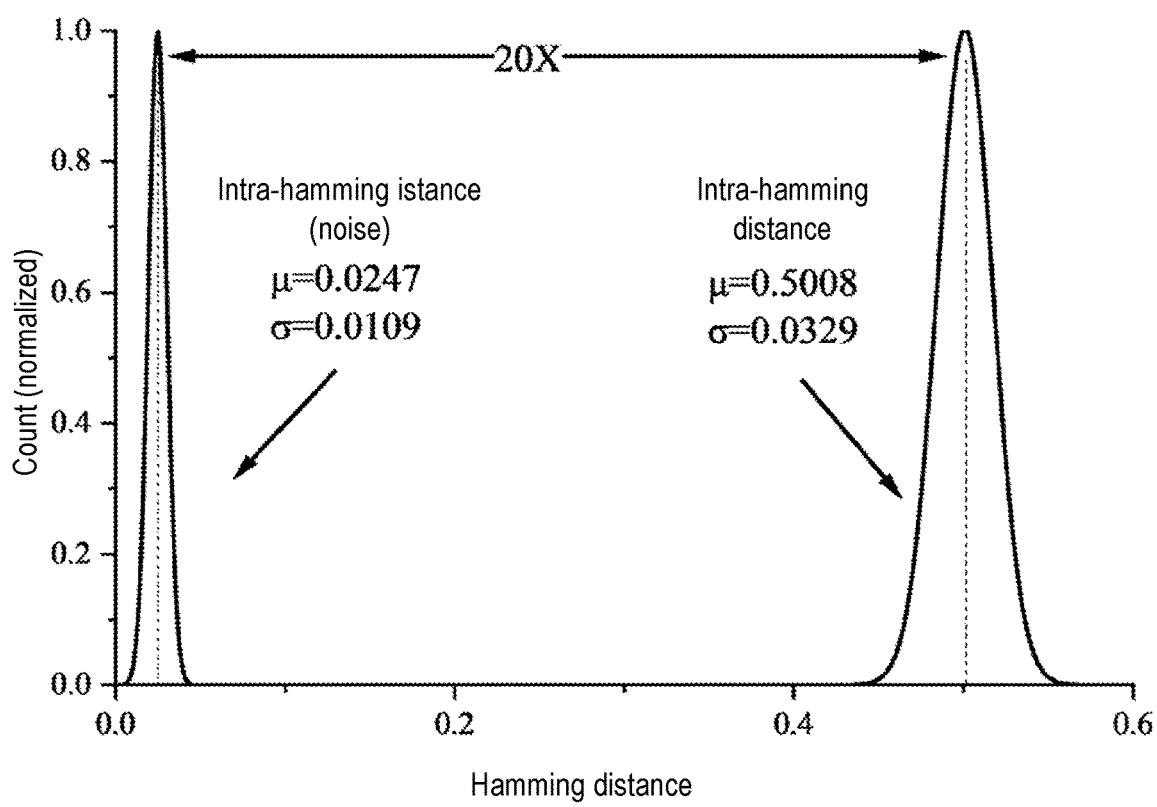
FIG. 10B illustrates the intra-hamming distance and the inter-hamming distance of the PUF circuit based on the threshold loss of MOSFETs in Embodiment 2 of the invention.

The intra-hamming distance and inter-hamming distance of the PUF circuit based on the threshold loss of MOSFETs in Embodiment 2 of the invention are shown in FIG. 10B. The intra-hamming distance and inter-hamming distance of the PP-PUF are tested in the same way as the intra-hamming distance and inter-hamming distance of the PP-PUF circuit. It can be seen from FIG. 10B that the hamming distance of the NN-PUF circuit is 0.0247, indicating that the NN-PUF circuit has good reliability, and that the inter-hamming distance is 0.5008, indicating that the NN-PUF circuit has good uniqueness.

Figure 11A:
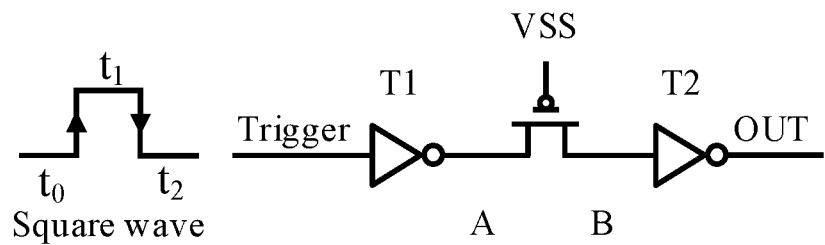
FIG. 11A is a structural diagram of one transmission path of the delay unit of PUF circuit based on the threshold loss of MOSFETs in Embodiment 1 of the invention.
Figure 11B:
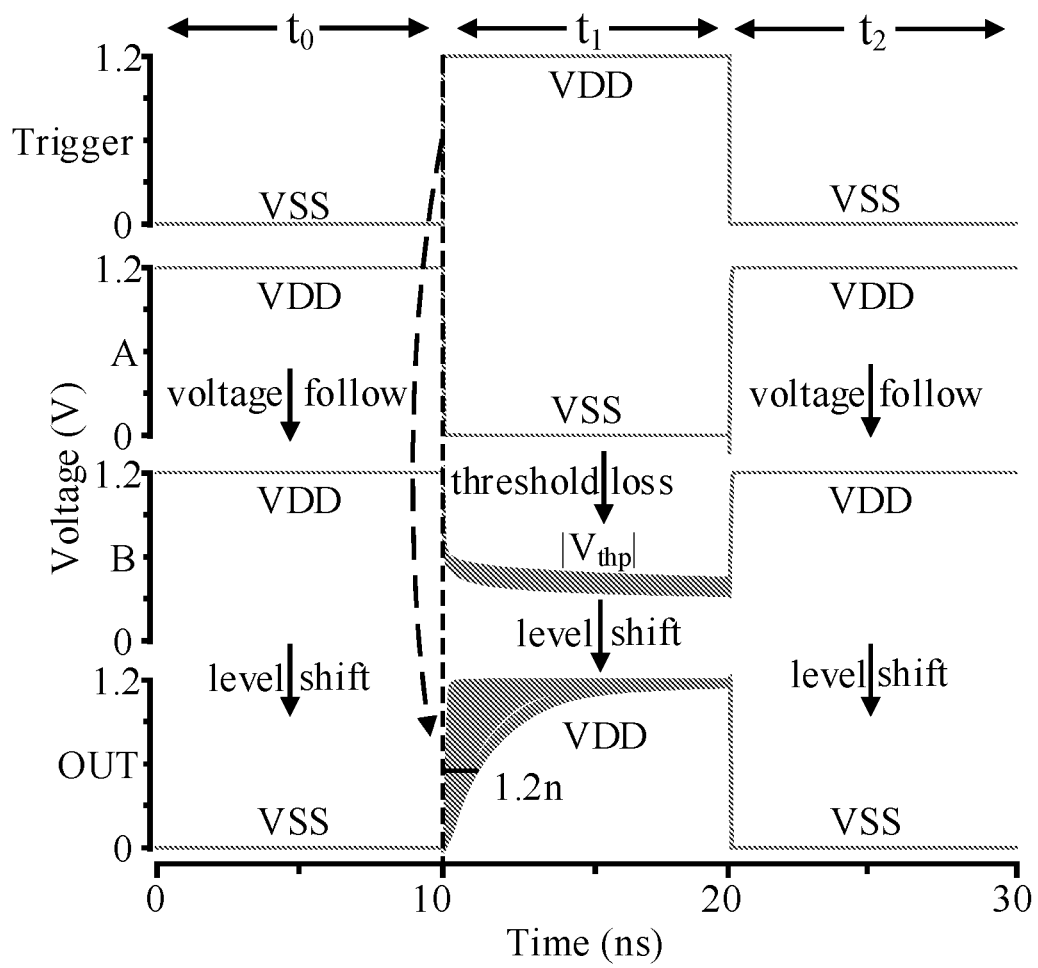
FIG. 11B is a diagram of 200 times of Monte Carlo simulation of the transmission path in FIG. 11A.

The structural view of one transmission path of the delay unit of the PUF circuit based on the threshold loss of MOSFETs in Embodiment 1 is shown in FIG. 11A, and the diagram of 200 times of Monte Carlo simulation of the transmission path in FIG. 11A is shown in FIG. 11B. It can be seen from FIG. 11B that the square signal is inverted by an inverter T1, then reaches a point A, and then passes through a PMOS transistor, then the absolute value $|V_{thp}|$ of the threshold voltage $V_{thp}$ of the PMOS transistor is output at a point B, and then a square signal OUT is output after the square signal is inverted by an inverter T2. Thus, by means of the threshold loss generated when the square signal transmitted through the PMOS transistor decreases from a high level to a low level, the delay unit greatly increases the delay difference generated when the output square signal OUT rises from a low level to a high level, thus improving the randomness of the PUF circuit.

Figure 12A:
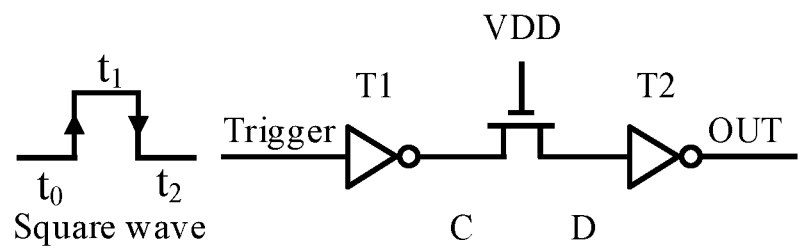
FIG. 12A is a structural diagram of one transmission path of the delay unit of PUF circuit based on the threshold loss of MOSFETs in Embodiment 2 of the invention.
Figure 12B:
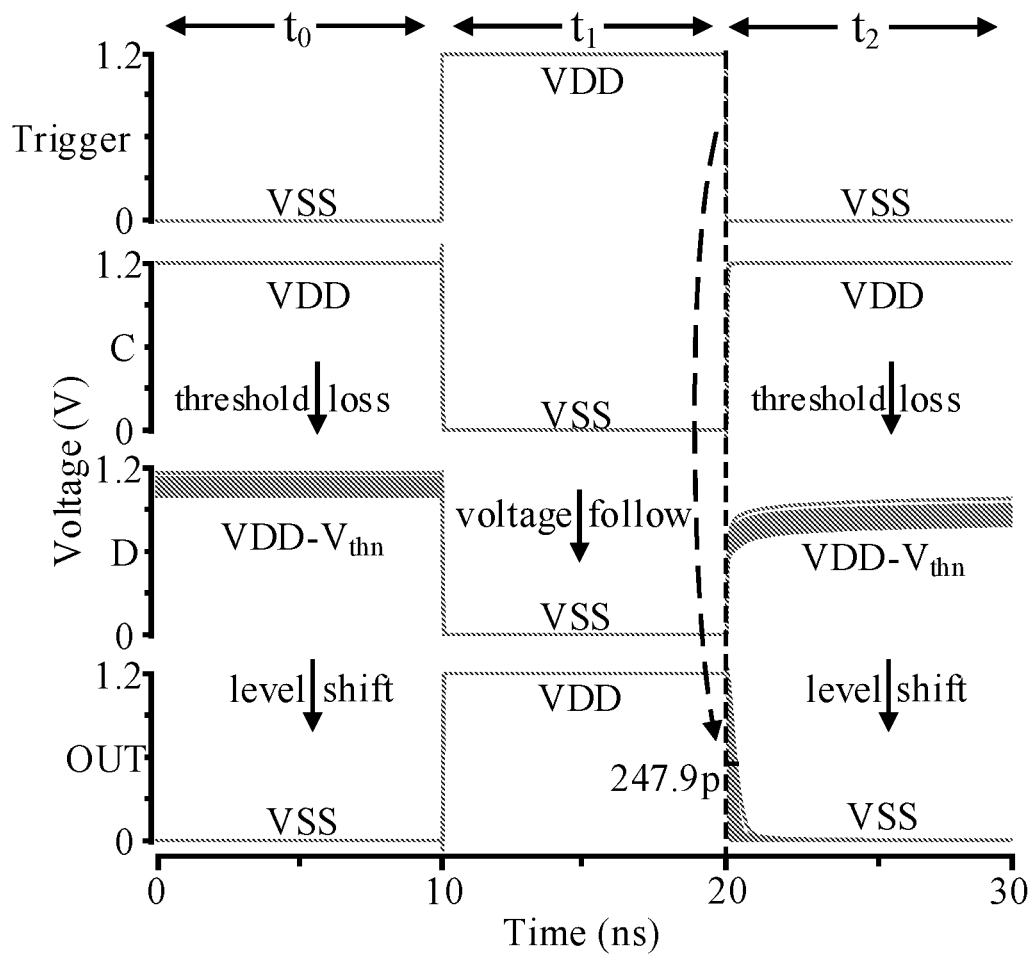
FIG. 12B is a diagram of 200 times of Monte Carlo simulation of the transmission path in FIG. 12A.

The structural view of one transmission path of the delay unit of the PUF circuit based on the threshold loss of MOSFETs in Embodiment 2 is shown in FIG. 12A, and the diagram of 200 times of Monte Carlo simulation of the transmission path in FIG. 12A is shown in FIG. 12B. It can be seen from FIG. 12B that the square signal is inverted by the inverter T1, then reaches a point A, and then passes through the PMOS transistor, then VDD–$V_{thn}$ is output at a point D, and then a square signal OUT is output after the square signal is inverted by the inverter T2. Thus, by means of the threshold loss generated when the square signal transmitted through the PMOS transistor rises from a low level to a high level, the delay unit greatly increases the delay difference generated when the output square signal OUT deceases from a high level to a low level, thus improving the randomness of the PUF circuit.

NIST SP 800-22 randomness tests are carried out on the traditional APUF circuit, the PP-PUF circuit in Embodiment 1 and the NN-PUF circuit in Embodiment 2; if the P-value of the PUF circuit is greater than 0.01, the PUF circuit passes the tests; and 100,000 sets of responses are extracted from each of the three PUF circuits, and specific test data are shown in Table 1. It can be seen from data in Table 1 that the traditional APUF circuit only passes two tests, the PP-PUF circuit in Embodiment 1 and the NN-PUF circuit in Embodiment 2 pass nine tests, seven test more than the traditional APUF, thus having better randomness.

To sum up, compared with the traditional APUF circuit, the PUF circuit based on the threshold loss of MOSFETs is lighter, the delay difference between two square signals outputted by the $N^{th}$ stage of delay unit is larger, so the PUF circuit based on the threshold loss of MOSFETs has better randomness and is more suitable for key generation, identity authentication and other aspects in the resource-constrained security field.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A PUF circuit based on a threshold loss of MOSFETs comprises N stages of delay units and an arbiter, wherein $N=2^m$, m is an integer which is greater than or equal to 6, the N stages of delay units are identical in structure and are cascaded in sequence, the N stages of delay units are sequentially referred to as a first stage of delay unit to an $N^{th}$ stage of delay unit, the $N^{th}$ stage of delay unit is connected to the arbiter, each stage of delay unit is configured to allow two square signals input thereto to pass through in parallel or in a crossed manner under the control of a control signal input to the stage of delay unit to generate and output two square signals, the two square signals generated by the prior stage of delay unit are output to the next stage of delay unit, and the arbiter is configured to extracting, by comparison, a delay difference between the two square signals outputted by the $N^{th}$ stage of delay unit to generate and output a response; characterized in that each of the delay units comprises six inverters and four MOS transistors, the four MOS transistors are all PMOS transistors or NMOS transistors, the six inverters are referred to as a first inverter, a second inverter, a third inverter, a fourth inverter, a fifth inverter and a sixth inverter respectively, the four MOS transistors are referred to as a first MOS transistor, a second MOS transistor, a third MOS transistor and a fourth MOS transistor respectively, an input terminal of the first inverter is used as a first input terminal of the each of delay units to receive a first path square signal, an input terminal of the fourth inverter is used as a second input terminal of the each of the delay units to receive a second path square signal, an output terminal of the first inverter, a source of the first MOS transistor and a source of the second MOS transistor are connected, an output terminal of the fourth inverter, a source of the third MOS transistor and a source of the fourth MOS transistor are connected, a drain of the first MOS transistor, a drain of the fourth MOS transistor and an input terminal of the third inverter are connected, a drain of the second MOS transistor, a drain of the third MOS transistor and an input terminal of the sixth inverter are connected, a gate of the first MOS transistor, an input terminal of the second inverter, a gate of the third MOS transistor and an input terminal of the fifth inverter are connected and a connecting terminal is used as a control terminal of the each of the delay units to receive a control signal, an output terminal of the second inverter and a gate of the second MOS transistor are connected, an output terminal of the fifth inverter and a gate of the fourth MOS transistor are connected, and an output terminal of the third inverter and an output terminal of the sixth inverter are used as two output terminals of the each of the delay units to generate and output the two square signals.

2. The PUF circuit based on the threshold loss of MOS-FETs, according to claim 1, wherein when the four MOS transistors are all PMOS transistors, the arbiter comprises two two-input NAND gates, each two-input NAND gate has a first input terminal, a second input terminal and an output terminal, the two two-input NAND gates are referred to as a first two-input NAND gate and a second two-input NAND gate respectively, the first input terminal of the first two-input NAND gate and the second input terminal of the second two-input NAND gate are configured to receive the two square signals outputted by the $N^{th}$ stage of delay unit respectively, the second input terminal of the first two-input NAND gate and the output terminal of the second two-input NAND gate are connected and a connecting terminal is used as an output terminal of the arbiter to output the response, and the output terminal of the first two-input NAND gate and the first input terminal of the second two-input NAND gate are connected.

3. The PUF circuit based on the threshold loss of MOS-FETs, according to claim 1, wherein when the four MOS transistors are all NMOS transistors, the arbiter comprises two two-input NOR gates, wherein each two-input NOR gate has a first input terminal, a second input terminal and an output terminal, the two two-input NOR gates are referred to as a first two-input NOR gate and a second two-input NOR gate respectively, the first input terminal of the first two-input NOR gate and the second input terminal of the second two-input NOR gate are used for receive the two square signals outputted by the $N^{th}$ stage of delay unit respectively, the second input terminal of the first two-input NOR gate and the output terminal of the second two-input NOR gate are connected and a connecting terminal is used as an output terminal of the arbiter to output the response, and the output terminal of the first two-input NOR gate and the first input terminal of the second two-input NOR gate are connected.

* * * * *